United States Patent [19]

Yudenfriend

[11] Patent Number: 4,489,134
[45] Date of Patent: Dec. 18, 1984

[54] PROCESS AND APPARATUS FOR FORMING A WINDOW PANEL HAVING AN ENERGY CONTROL FILM LAMINATE

[76] Inventor: Herbert Yudenfriend, 5065 Wynnefield Ave., Philadelphia, Pa. 19131

[21] Appl. No.: 397,771

[22] Filed: Jul. 13, 1982

[51] Int. Cl.³ .................. B32B 27/30; B32B 27/28; B32B 17/10
[52] U.S. Cl. .................. 428/412; 428/522; 156/71; 156/99; 156/107; 156/109; 156/247; 156/249; 156/281
[58] Field of Search ............ 156/109, 107, 71, 281, 156/249, 247, 99; 428/412, 522, 34

[56] References Cited

U.S. PATENT DOCUMENTS

| Re. 28,883 | 6/1976 | Willdorf | 156/71 |
|---|---|---|---|
| 3,262,829 | 7/1966 | Conti | 156/281 |
| 3,701,706 | 10/1972 | Giddings | 428/412 |
| 3,718,516 | 2/1973 | Buckley | 428/437 |
| 3,775,226 | 11/1973 | Windorf | 428/216 |
| 3,776,805 | 12/1973 | Hansen | 428/412 |
| 3,837,952 | 9/1974 | Mogford | 156/99 |
| 3,901,755 | 8/1975 | Martin | 428/483 |
| 3,949,134 | 4/1976 | Willdorf | 156/99 |
| 3,977,930 | 8/1976 | Hunter | 156/71 |
| 4,075,386 | 2/1978 | Willdorf | 428/216 |
| 4,081,300 | 4/1978 | Willdorf | 156/71 |
| 4,177,099 | 12/1979 | Radzwill | 156/99 |
| 4,226,910 | 10/1980 | Dahlen et al. | 428/336 |

*Primary Examiner*—Ellis P. Robinson
*Attorney, Agent, or Firm*—Banner, Birch, McKie & Beckett

[57] ABSTRACT

The invention is directed to a method and apparatus for applying a sheet of energy control film to the surface of a window panel wherein the film comprises an adhesive stratum adapted to contact and cause the film the adhere to the panel. The method includes the steps of: submerging the window panel in a filtered demineralized water bath; submerging the energy control sheet and passing it through the bath; submerging a removable protective layer in the bath and superposing it upon the energy control film sheet; and pressing the energy control sheet, while submerged in the bath, into intimate contact with the window panel by squeegeeing across the exposed surface of the removable protective layer. The method also includes the steps of: prewashing the window panel before submerging it in the filtered demineralized water bath; and eliminating static electricity from the film before submerging it in the bath to loosen the dust and dirt particles from the film and then washing the film to remove the loosened dust and dirt particles. In applying the energy control film to an acrylic or polycarbonate window panel, the method also includes the step of preheating the acrylic or polycarbonate to remove excess water and uncured monomers.

17 Claims, 4 Drawing Figures

PROCESS AND APPARATUS FOR FORMING A WINDOW PANEL HAVING AN ENERGY CONTROL FILM LAMINATE

BACKGROUND OF THE INVENTION

This invention relates to a process and apparatus for forming a window panel having an energy control film laminate and an acrylic or polycarbonate multi-panel window unit product having an energy control film laminate. In particular, the invention encompasses a method of applying a metallized transparent polymer film to the No. 2 surface of an insulating glass, acrylic or polycarbonate window unit.

The quest for reducing energy loss in homes and buildings has led to the development of an energy control film, applied to a surface of a window panel, to improve the shading coefficient and the R value thereby reducing total heat transmission and heat loss during the summer and winter months, respectively. Attempts at first were directed to designing solar energy control film sheets concerned with keeping sunlight's heat and glare from affecting the comfort of those inside a room (see, e.g., U.S. Pat. No. 2,744,021 and U.S. Pat. No. 3,290,203). These sheets, however, have been most widely used in geographical areas where the outside temperature rarely falls below 0° C. Studies show, however, that windows not only contribute heavily to high air conditioning energy usage in the summer, but also contributes significantly to high heating costs in winter. The thermal conductance (or "U" value—the reciprocal of "R" value) of a single glazed window typically exceeds 5 kcal/°C./hr/m$^2$, whereas a well-insulated wall has a value less than 0.5 and a well-insulated ceiling has a U value less than 0.2. Consequently, heat can be lost through a conventionally glazed window at a rate over an order of magnitude greater than through insulated walls or ceilings.

Individuals having windows protected with solar control film frequently experience cold during winter for at least two reasons: solar-originating near infra-red energy is reflected back outside; and, heat inside the room is transferred to the window-pane by radiation and convection resulting in energy loss to the outside. Half of such loss is caused by radiation of internal infra-red energy from the skin of room occupants, as well as from objects in the room, to the solar control film whereby it is conducted to the outboard window panel and radiated to the outside. Attempts to maintain the advantages of solar energy control film while improving their poor insulating properties has led to the development of the energy control film disclosed in U.S. Pat. No. 4,226,910, assigned to Minnesota Mining and Manufacturing Company. This product, known as "Scotchtint" and related products, exclude externally originating heat and glare during the summer, but also substantially reduce heat loss from internally-originating infra-red radiation during the winter or, indeed, whenever the outside temperature is lower than the inside temperature.

It has been noted, however, in applying this film, or any other reflective metallized transparent polymer film, that dirt and dust particles become entrapped between the film and the window panel. Frequently, the film is inadvertently scratched or blemished during the application process. While some methods have been utilized in the prior art to reduce the entrapment of dust particles and to prevent scratches, these methods have not been generally acceptable. U.S. Pat. No. 3,837,952 discloses the application of a removable adhesive coated dust particle collecting member to remove dust particles from the glass panel. This prior art system also discloses a "wet method" which includes placing the glass panel on a table, hosing it down with water and applying an adhesive coated plastic sheet on the water layer, applying water to the exposed surface of the plastic sheet, and squeegeeing the exposed surface of the plastic sheet to press the plastic sheet into contact with the glass. Each glass and laminated sheet is then individually dried for approximately 24 hours to permit bonding of the laminate to the glass. This process, however, is time consuming and requires excessive materials, labor and drying space. In addition, due to the formation of static electricity during the manufacturing process, dust frequently becomes entrapped between the layers of the film and contacts the adhesive itself. This "wet method" merely picks up the dirt on the surface of the glass, it doesn't provided sufficient wetting of the film by passing it through a special bath to eliminate dust and dirt from the film's adhesive layer. No means are provided for eliminating static electricity to minimize the accummulation of dust and dirt particles on the film.

U.S. Pat. No. Re. 28,883 discloses a solar control film containing an integrally formed silcon release stratum on the surface of the film which serves as both a lubricant when the film is applied and as a protective coating to prevent scratches when the film is washed after being laminated in place. However, an energy control film which, otherwise, provides both winter and summer benefits will not function as desired if a release stratum is applied to the surface of the film. That is, the release stratum will eliminate the desired winter benefits since heat loss from internally originating infra-red radiation will be substantially increased. Consequently, the desired benefits of increasing the shading coefficient and the R value of a window unit to reduce total heat transmission and heat loss during the summer and winter months, respectively, will not be achieved with an integrally formed release stratum.

Furthermore, the prior art discussed above has been directed to the use of an energy control film on glass glazing units, rather than on acrylics or polycarbonates. Attempts in the prior art to apply metallized transparent polymer film to acrylic or polycarbonate surfaces have resulted in commercially unacceptable laminates. Surprisingly, it has been found that acrylics and polycarbonates give off water vapor and uncured monomers over a period of time; these gases create bubbles in the surface of the film and adversely affect its visual appearance and energy advantages.

The use of acrylics or polycarbonates would provide additional shatterproofing of the window panel, while permitting desirable thermal conductance not obtained by standard glass glazing units. Applying energy control film to the surface of such a panel would permit additional benefits making the structure commercially attractive. Additional benefits would be obtained by the use of an acrylic or polycarbonate window panels in an insulated window unit. This, however, has not been attempted in the prior art since the water vapor and uncured monomer problem noted above creates moisture buildup in the space between the acrylic or polycarbonate panels.

SUMMARY OF THE INVENTION

It is therefore an object of the present invention to overcome the above noted disadvantages and deficiencies in the prior art by providing a process and apparatus for forming a window panel having an energy control film laminate which effectively prevents the entrapment of dust or dirt particles between the film and window panel.

Another object of the invention is to provide such a process and apparatus which effectively eliminates the dust and dirt particles formed on the film adhesive during the film manufacturing process.

Another object of the invention is to provide a removable protective layer during the laminating process so that the film remains free from scratches and blemishes, while not adversely affecting the insulating and shading parameters of the laminated panel.

Another object of the present invention is to provide a process and apparatus for forming a film laminate on an acrylic polycarbonate window panel which provides a useful life heretofore known only with glass glazing units.

Another object of the invention is to provide an insulated acrylic or polycarbonate window unit which has the utility and useful life heretofor known only with glass insulated glazing units.

As discussed, the prior art methods involve the application, by hand, of an energy control film to a glass window panel; however, this process is time consuming, costly and generally does not result in a laminated window panel substantially free of dust and dirt particles. While the "wet method" should, in theory, eliminate some quantities of dust particles, in practice objectional quantities of dust and dirt particles remain entrapped on the film's adhesive stratum. No matter how much care was exercised with this process, scratches and blemishes frequently occurred during application of the film to the window panel. Surprisingly, it has been found in accordance with the process and apparatus of the instant invention, that an improved laminated window panel can be obtained without the disadvantages incident to the "wet method" process.

The above and other objects of the invention are accomplished by providing a method and apparatus for applying a sheet of energy control film to the surface of a window panel. The method includes the steps of: submerging the window panel in a filtered demineralized water bath; submerging the energy control sheet and passing it through the bath; submerging a removable protective layer in the bath and superposing it upon the energy control film sheet; and pressing the energy control sheet, while submerged in the bath, into intimate contact with the window panel by squeegeeing across the exposed surface of the removable protective layer. The method also includes the steps of: prewashing the window panel before submerging it in the filtered demineralized water bath; and eliminating static electricity from the film before submerging it in the bath to loosen the dust and dirt particles from the film and then washing the film to remove the loosened dust and dirt particles. In applying the energy control film to an acrylic or polycarbonate window panel, the method also includes the step of preheating the acrylic or polycarbonate to remove excess water and uncured monomers.

The invention also encompasses an apparatus for carrying out the above described method. The apparatus comprises a tray having a glass bottom support panel which contains the demineralized filtered water so that the submerged window panel rests upon the glass bottom panel. The tray is movable between a horizontal position for applying the energy control film to the panel and a substantially vertical position for facilitating removal of the window panel from the tray.

The invention also encompasses an acrylic or polycarbonate window panel having a layer of energy control film applied by the above described method. The invention also encompasses a multi-panel insulated window unit comprising at least one acrylic or polycarbonate window panel insulated from the other panels by a spacer tube containing a desiccant for removing trapped moisture between the window panels and hermetically sealed around the perimeter.

For convenience, the invention is described throughout the specification in the context of an energy control film applied to the surface of the window panel. The invention can be practiced with any metallized transparent polymer film, and particularly with a metallized transparent polymer film that improves the shading coefficient and R value, thereby reducing total heat transmission and heat loss during the summer and winter months, respectively. The different types of energy control film that can be used, in single or multiple layers, include polyester, acrylic and silicon films. Commercially manufactured films that can, for example, be used with the invention include "Scotchtint," "Van Leer," "Gila River," "Nun-Sun," and "Sun-Gard." It should be understood, however, that the invention is not limited to the particular type of reflective film used, but is directed to the process and apparatus for applying such film, an acrylic or polycarbonate window panel product formed by each process, and multi-panel insulated window units comprising at least one acrylic or polycarbonate panel, incorporating such film. Where the term "window panel" is used, the term is understood to encompass a glass window, an acrylic or polycarbonate window panel, or other transparent/translucent/opaque panels for use in any opening, including the wall of a room. It should also be understood that the invention can be utilized in forming a multi-panel insulated window unit comprising a plurality of window panels separated from each other and peripherally hermetically sealed to provide one or more intervening desiccated air space. The energy control film can be applied to any one or more surface, but preferably to the No. 2 surface (i.e., the inside surface of the outboard window panel).

BRIEF DESCRIPTION OF THE DRAWINGS

The novel features of the invention are set with particularity in the appending claims, but the invention will be understood more fully and clearly from the follow detailed description of the invention as set forth in the accompanying drawings, in which:

DETAILED DESCRIPTION OF THE INVENTION

Figure 1:
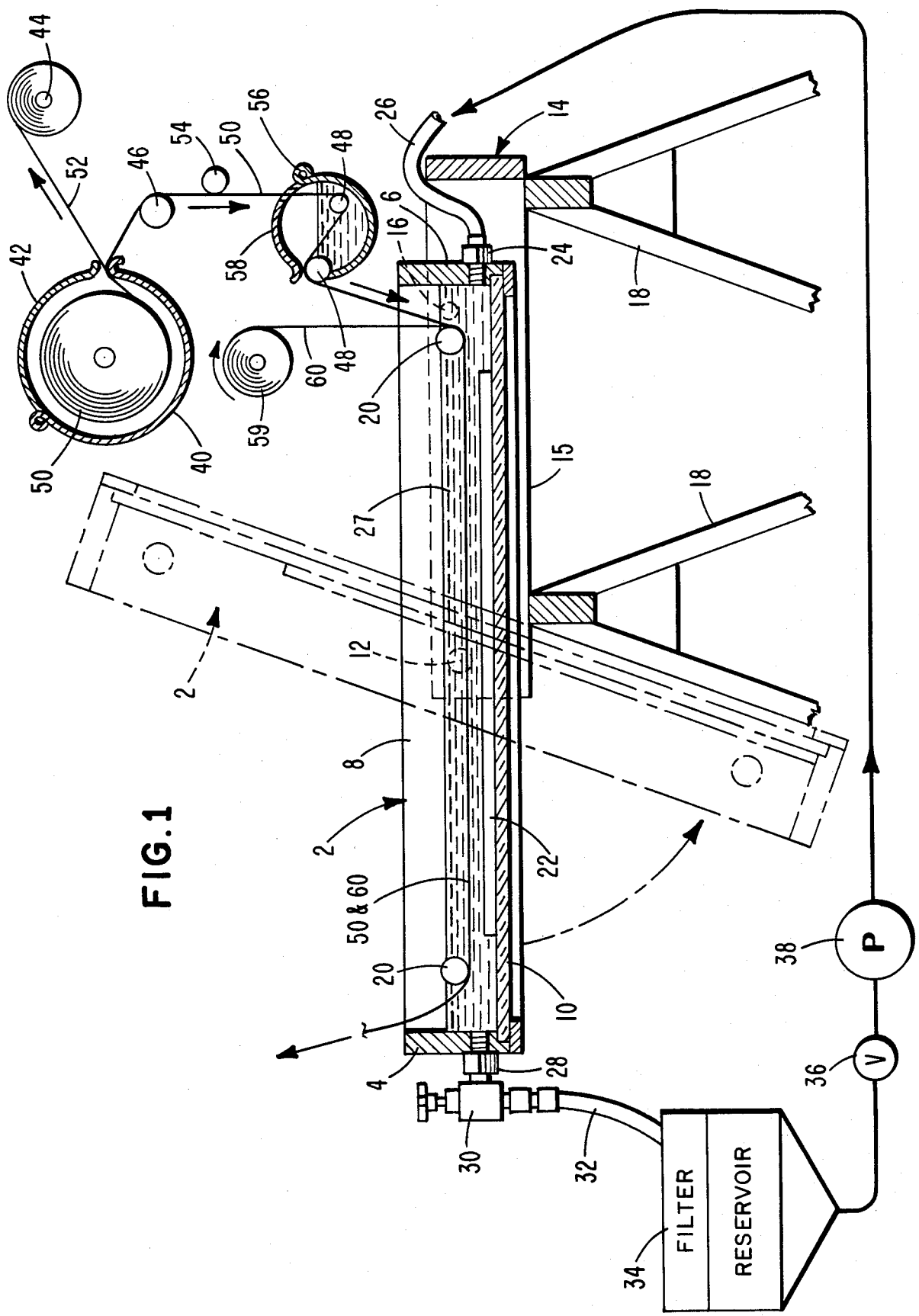
FIG. 1 is a vertical longitudinal sectional view of the apparatus for practicing the method of the invention.
Figure 2:
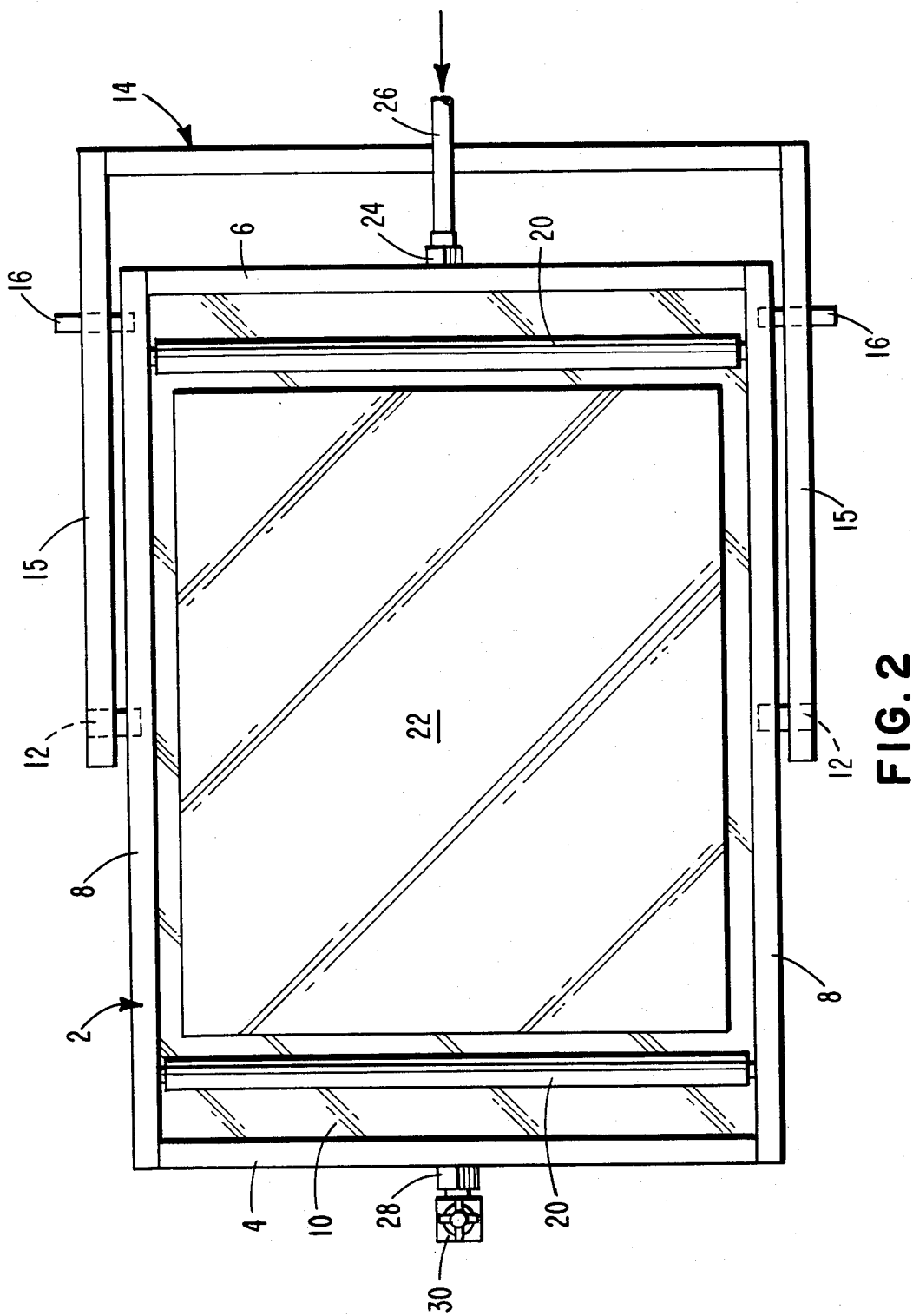
FIG. 2 is a top plan view of the apparatus shown in FIG. 1.

FIGS. 1 and 2 illustrate the apparatus of the invention for applying a sheet of energy control film to the surface of a window panel 22. Shown in FIGS. 1 and 2 is a tray or receptacle 10 pivotally mounted about axis 12. Tray 2 is pivotally mounted to stationary frame 14 and can be moved from a horizontal position to substantially vertical position, as shown in dotted lines. Supporting frame 14 has a generally U-shaped configuration having supporting arms 15. Near each end of frame arms 15 is a pivoting pin 12 which pivotally couples the frame to tray 2. Frame 14 is maintained in a stationary position by supporting legs 18 which are mounted to the underside of supporting arms 15. Positioned along each side of frame 14 is a locking hole which is aligned with a corresponding locking hole in tray 2. Each aligned locking hole receives a removable locking pin 16 for maintaining tray 2 in a horizontal position during the application of the film to the window panel.

As shown, tray 2 has a box-like configuration comprising front panel 4, rear panel 6, left and right side panels 8 and bottom support panel 10. The front, rear and side panels are preferably constructed of wood but can be constructed of any material which is impervious to liquid. Bottom support panel 10 is constructed of glass and is interfitted with the other panels to form a water-tight sealed construction. Each pivot pin 12 is mounted along the center of sides 8 so that frame 2 can be easily pivoted to a substantially vertical position. Positioned within tray 2 are a pair of spaced horizontally oriented film and protective layer guiding rollers 20. As shown in FIGS. 1 and 2, guiding rollers 20 are so spaced that they extend just beyond the length of window panel 22. As will be discussed, rollers 20 are positioned just above the window panel so that the energy control film 50 and removable protective layer 60 pass slightly above the panel's exposed surface.

An inlet coupling 24 is provided on rear panel 6 for permitting demineralized filtered water 27 to pass through an inlet hose 26 into tray 2. An outlet coupling 28 is provided on front panel 4 to drain water bath 27 after window panel 22 has been processed in accordance with the present invention. Outlet coupling 28 is connected to outlet faucet 30 for removing the water through an outlet hose 32 and passing it into a filter reservoir 34. Filter reservoir 34 filters the water so it can be reused for processing other window panels. The demineralized water filtered by reservoir 34 then passes through a control valve 36 and pump 38 which pumps the water through inlet hose 26 and back into tray 2. Control valve 36 controls the flow of water into tray 2 and permits system shutoff when the desired water level is reached in the tray. Outlet faucet 13 is used to drain the water from tray 2 after the process of applying energy control film to the panel's surface is completed. It has been found that pivoting of tray 2 aids in draining while it permits window panel 22 to be easily removed from the tray.

As shown in FIG. 1, energy control film 50 is housed in an antistatic dustfree container 40. Container 40 has a hinged lid 42 which permits access to container 40 for replacing the roll of film. Film 50 may include a protective backing 52 which must be removed before the film is applied to a window panel. Accordingly, a protective backing stripping roller 44 is provided adjacent container 40 for stripping the backing 52 from energy control film 50.

Energy control film 50 passes over a container guide roller 46, mounted near the outlet of antistatic dustfree container 40, along a pair of spaced washing guide rollers 48, and along film and protective layer guide rollers 20. Positioned between washing guide rollers 48 and container guide roller 46 is a static eliminator 54. Static eliminator 54 eliminates static electricity from film 50 thereby loosening dust and dirt particles from the film. Washing guide rollers 48 are housed within a washing container 56 containing a washing solution for removing the dust and dirt particles loosened by static eliminator 54. Washing container 56 has a hinged lid 58 which permits access to container 56 for repairing or replacing rollers 48 and/or replacing the washing solution.

Positioned adjacent washing container 56 is a removable protective layer roll 59 which supplies removable protective layer 60. Removable protective layer 60 passes over guide rollers 20 and is superposed upon energy control film 50. As shown in FIG. 1, both film 50 and layer 60 are guided along rollers 20 while submerged within the demineralized filtered water bath, in a direction generally parallel to window panel 22.

The process in accordance with the instant invention will now be described in detail. Tray 2 is first placed in horizontal position with locking pins 16 engaging the locking holes within frame arms 15 and side panels 8. Window panel 22 is then pre-washed in a standard glass washing machine. In the case of a acrylic or polycarbonate window panel, the panel is heated at a certain temperature before beginning the prewashing step. This pre-cures the acrylic or polycarbonate and substantially eliminates inherent water and uncured monomers. In particular, the thickness of the acrylic or polycarbonate panel determines the heating time. For example a ¼ inch piece of acrylic or polycarbonate should be preheated at 120°–130° F. for eight hours, while a ⅛ inch piece should be preheated at approximately 120°–130° F. for four hours. Window panel 22 is then positioned on glass bottom support panel 10. Support panel 10 provides a surface which will not corrode, is flat, remains level and prevents any blemishing and scratching of window panel 22.

After window panel 22 is placed in tray 2, filtered demineralized water is supplied into tray 2 through inlet hose 26, thereby submerging window panel 22 and guiding rollers 20. Energy control film 50 and protective layer 60 is then passed over guide rollers 20 and through demineralized filtered bath 27. Energy control film 50 is then pressed into intimate contact with window panel 22 while submerged in the bath by squeegeeing across the exposed surface of the removable protective layer 60. The squeegeeing process can occur mechanically or automatically by spreading, pushing, pulling or wiping the water across the exposed surface of removable protective layer 60. The application of the film to the window panel, while submerged in the bath, prevents any dust particles from entering between the glass and the film. The formation of static electricity on the film surface during processing is neutralized by static eliminator 54; dirt and dust particles are then washed and removed from the film by passage through washing container 56. Moreover, passage of the film through bath 27, in a direction generally parallel to panel 22, removes any residual dirt and dust particles formed on the film. Each step of the above-described process aids in effectively eliminating the entrapment of dust and dirt particles between film 50 and the surface of window panel 22.

During further processing of the film laminate in accordance with the invention, outlet faucet 30 is opened and the water is drained into filter reservoir 34. Locking pins 16 are removed and table 2 is pivoted downwardly to aid in draining water from the table. After the water is completely drained, film 50 is again pressed into intimate contact with the window panel by squeegeeing across the exposed surface of the removable protective layer. This is done to remove any excess water between the film and surface of panel 22. The film laminate is removed from the table, the excess film and layer is trimmed, the layer and film laminate is dried, and layer 60 is then removed from film 50. The use of protective layer 60 prevents the formation of blemishes and scratches on the film 50 during the application of the film to the window panel surface. This layer is only needed during that application and its removal allows the desired energy characteristics of the film to be maintained.

The above process has been described with protective layer 60 separate from film 50. It should also be understood that film 50 can be manufactured with a removable protective layer applied to its upper surface. In that event, there is no need for removable protective layer roll 59. Of course, after squeegeeing the exposed surface of layer 60 to press film 50 into contact with window panel 22, layer 60 can then be removed.

Figure 3:
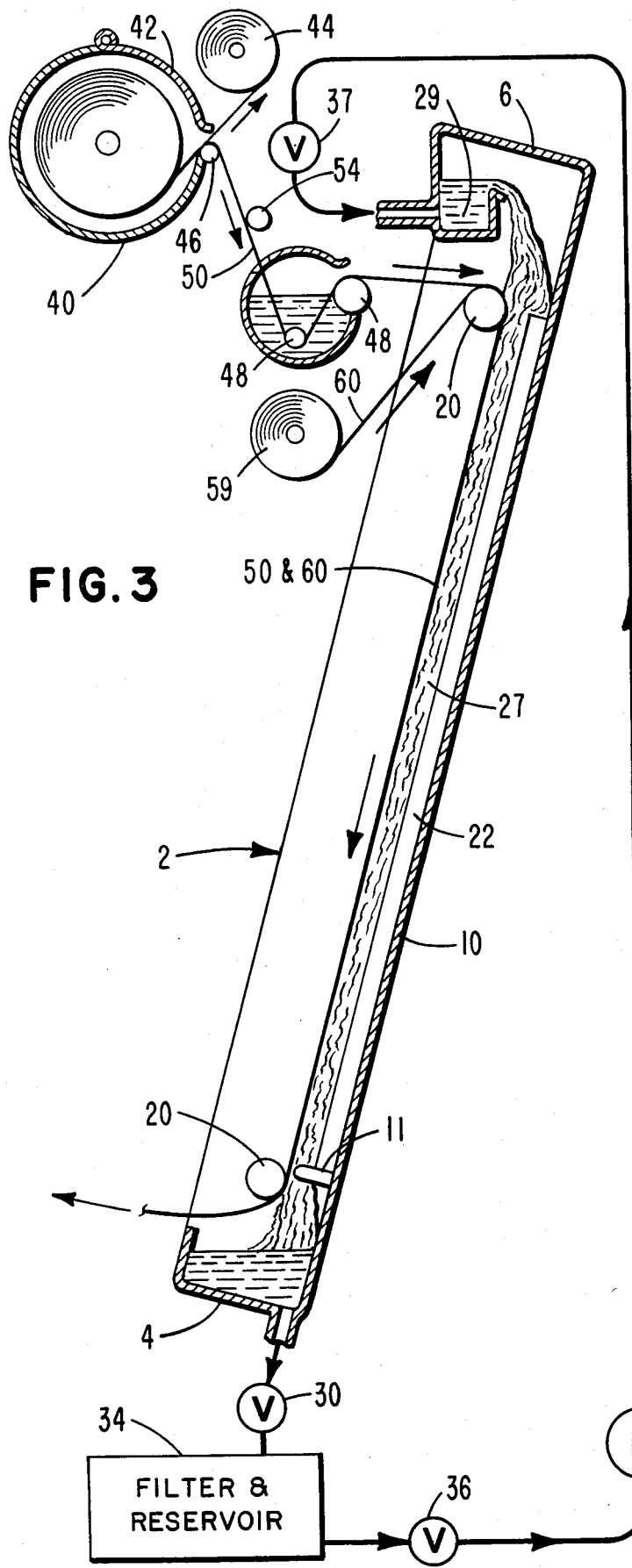
FIG. 3 is a vertical longitudinal sectional view of another embodiment of the apparatus for practicing the method of the invention.

FIG. 3 shows another embodiment of the invention whereby tray 2 is fixed in an inclined position. It has been found that the process in accordance with the invention can be utilized with the tray moved from a horizontal position to a tilted fixed position provided window panel 22 remains flat against bottom panel 10 and remains submerged in bath 27 while film 50 and protective layer 60 pass through the bath. The apparatus elements shown in FIG. 3 which are identical to the elements of FIGS. 1 and 2 have been given the same reference numerals. The operation of those elements have been described with reference to FIGS. 1 and 2, and for the sake of brevity, will not be described with reference to FIG. 3. FIG. 3, however, includes the additional elements of an input flow valve 37, an input reservoir 29 and a window panel support 11. Window panel support 11 is positioned near the front panel 4 of tray 2 for holding window panel 22 in a fixed position so that film 50 can be applied to the panel's surface without movement. Input flow valve 37 receives filtered demineralized water from pump 38 and is adjusted to permit a constant flow of water entering an input reservoir 29. Input reservoir 29 is positioned above the upper edge of window panel 22 and permits a constant and steady flow of water across protective layer 60, energy control film 50 and window panel 22. As a result, during application of film 50 to the surface of window panel 22, the adhesive stratum of film 50 is submerged, thoroughly soaked and exposed to a constant flow of demineralized filtered water. This apparatus, therefore, provides a sufficient wetting, submersion and water flow so that dust and dirt particles on the surface of the adhesive and film surface are loosened and removed.

Figure 4:
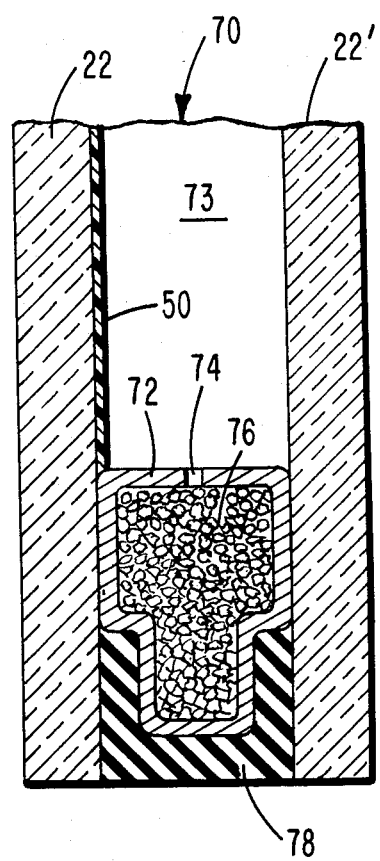
FIG. 4 is a sectional view through an insulated window unit incorporating at least one acrylic or polycarbonate window panels having an energy control film.

FIG. 4 shows an insulated window unit 70 comprising a pair of spaced window panels 22, 22' of acrylic or polycarbonate composition. Applied to the No. 2 surface of outboard window panel 22 is an energy control sheet 50. Outboard panel 22 and inboard panel 22' are spaced by a generally rectangular spacer tubing 72 containing a desiccant 76 for removing moisture from the intervening airspace 73. Tubing 72 includes an orifice 74, facing airspace 73, for permitting moisture to pass into contact with desiccant 76. Window panels 22 and 22' are hermetically sealed by a sealing mastic 78 which extends around the periphery of the panels and receives spacer tubing 72 along its inner edges.

As previously discussed, prior art window units generally comprise multi-pane glazing units comprising spaced glass panes, rather than spaced acrylic or polycarbonate panels. Since acrylic or polycarbonate panels contain excessive water and uncured monomers, such insulating units were believed impractical and not commercially feasible. The instant invention permits the design of a multi-panel window insert having at least one acrylic or polycarbonate window panel, as shown in FIG. 4. By processing the panels as described above including pre-curing of the panels to remove excessive water and uncured monomers, acrylics and polycarbonates can be used and incorporated in insulated window units. It has been found, moreover, that film 50 applied to the No. 2 surface of the unit also retards the formation of moisture when a temperature gradient exists across the window unit. That is, any moisture that builds up on the surface of window panel 22 will be entrapped by film 50, acting as a moisture barrier, to retard its passage into the desiccated airspace 73. Furthermore, it has been found that adding film 50 to the No. 2 surface of the outboard window panels makes the panel more shatter resistant which adds additional security as a concomitant benefit. Clearly, the use of an acrylic or polycarbonate in such a window unit increases the shatter resistance due to the improved inherent shatter resistance of such materials.

It has been found that the instant invention provides window units which are thinner but have the desirable transfer characteristics of larger window units. This is possible since the energy control films described above can now be applied, more effectively, to thinner window panels without breaking or blemishing the glass and/or film. For example, a ½ inch window unit can be designed having a 15% visibility, 0.19 shading coefficient and 0.41 winter U value; other competitive units, on the other hand, having the same transfer characteristics require a 1 inch window unit requiring the use of substantially heavier, more costly glass.

Numerous other modifications of the invention will be apparent to those skilled in the art without departing from the true spirit and scope of the invention which is defined by the appended claims.

I claim:

1. A method of preparing a substantially dust and scratch-free laminated window panel having an energy control film sheet attached to at least one surface of the window panel, said energy control film comprising an adhesive stratum adapted to contact and cause said film to adhere to said panel, comprising the steps of:
   submerging said window panel in a filtered demineralized water bath;
   submerging said energy control film sheet and passing it through said demineralized filtered water bath;
   submerging a removable protective layer in said demineralized filtered water bath and superposing it upon said energy control film sheet; and,
   pressing said energy control film sheet into intimate contact with said window panel, while submerged in the said bath, by squeegeeing across the exposed surface of said removable protective layer.

2. The method of claim 1 further comprising the steps of:
removing said window panel, containing the applied energy control film sheet and protective layer, from said bath; and
squeegeeing across the exposed surface of said removable protective layer to remove any excess of said demineralized filtered water.

3. The method of claim 2 further comprising the step of removing said protective layer from contact with said energy control film sheet after the steps of removing sand panel and squeegeeing.

4. The method of claim 1 wherein said demineralized filtered water bath comprises a tray, having a glass bottom support panel, which contains said demineralized filtered water and said submerged window panel rests upon said glass bottom panel.

5. The method of claim 4 wherein said tray is movable between a horizontal position for applying said energy control film sheet to said window panel and a substantially vertical position for facilitating removal of said window panel from said tray.

6. The method of claim 1 further comprising the step of prewashing said window panel before submerging it in said filtered demineralized water.

7. The method of claim 1 further comprising the steps of:
eliminating static electricity from said film sheet, before submerging it in said bath, so that dirt and dust particles are loosened from said film; and
washing said film, before submerging it in said bath, to remove said loosened dirt and dust particles.

8. The method of claim 1 wherein said window panel is an acrylic and includes the step of preheating said acrylic to remove excess water and uncured monomers.

9. The method of claim 1 wherein said window panel is a polycarbonate and includes the step of preheating said polycarbonate to remove excess water and uncured monomers.

10. An acrylic window panel substantially free of inherent water and uncured monomers and substantially dust and scratch free having a layer of bubble free energy control film applied to the surface of said panel, said energy control film comprising an adhesive stratum adapted to contact and cause said film to adhere to the panel, produced by the method of:
preheating said window panel to remove excess water and uncured monomers;
submerging said window panel in a filtered demineralized water bath;
submerging said energy control film sheet and passing it through said demineralized filtered water bath;
submerging a removable protective layer in said demineralized filtered water bath and superposing it upon said energy control film sheet; and,
pressing said energy control sheet into intimate contact with said window panel, while submerged in the said bath, by squeegeeing across the exposed surface of said removable protective layer.

11. A polycarbonate window panel substantially free of inherent water and uncured monomers and substantially dust and scratch free having a layer of bubble free energy control film applied to the surface of said panel, said energy control film comprising an adhesive stratum adapted to contact and cause said film to adhere to the panel, produced by the method of:
preheating said window panel to remove excess water and uncured monomers;
submerging said window panel in a filtered demineralized water bath;
submerging said energy control film sheet and passing it through said demineralized filtered water bath;
submerging a removable protective layer in said demineralized filtered water bath and superposing it upon said energy control film sheet; and
pressing said energy control sheet into intimate contact with said window panel, while submerged in the said bath, by squeegeeing across the exposed surface of said removable protective layer.

12. The window panel of claim 10 or 11 further comprising the steps of:
removing said window panel, containing the applied energy control film and protective layer, from said bath; and
squeegeeing the exposed surface of said removable protective layer to remove any excess of said demineralized filtered water.

13. The window panel of claim 12 further comprising the step of removing said protective layer from contact with said energy control film sheet after the steps of removing said panel and squeegeeing.

14. The window panel of claim 10 and 11 wherein said demineralized filtered water bath comprises a tray, having a glass bottom support panel, which contains said demineralized filtered water, and said submerged window panel rests upon said glass bottom panel.

15. The window panel of claim 14 wherein said tray is movable between a horizontal position for applying said energy control film to said window panel and a substantially vertical position for facilitating removal of said window panel from said tray.

16. The window panel of claim 10 or 11 further comprising the step of prewashing said window panel before submerging it in said filtered demineralized water.

17. The window panel of claim 10 or 11 further comprising the steps of:
eliminating static electricity from said film, before submerging it in said bath, so that dirt and dust particles are loosened from said film; and
washing said film before submerging it in said bath, to remove said loosened dirt and dust particles.

* * * * *